UNITED STATES PATENT OFFICE.

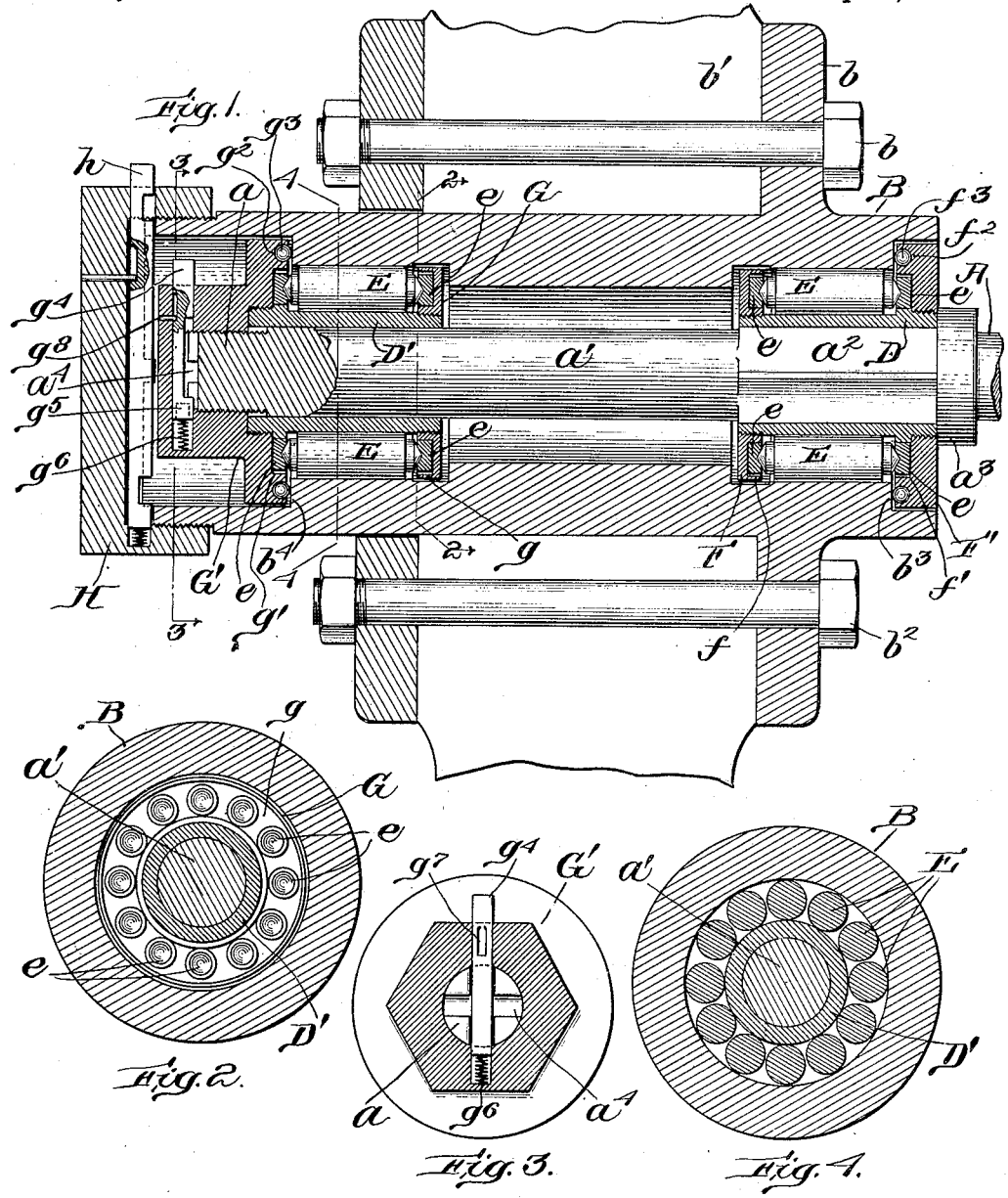

HARRY L. HANNAFORD, OF GLOUCESTER, MASSACHUSETTS.

HUB-BEARING.

No. 917,058.  Specification of Letters Patent.  Patented April 6, 1909.

Application filed January 20, 1908. Serial No. 411,600.

*To all whom it may concern:*

Be it known that I, HARRY L. HANNAFORD, a citizen of the United States, and resident of Gloucester, in the county of Essex and State of Massachusetts, have invented new and useful Improvements in Hub-Bearings, of which the following is a specification.

My invention is an anti-friction locking system for mounting the hub of a wheel upon the axle of a carriage and is more particularly designed for heavy service vehicles, such as motor cars and the like.

In the drawings hereto annexed, Figure 1 is a central, longitudinal section of my improved hub, the rollers and part of the axle being unsectioned; Fig. 2 is a section on line 2—2 of Fig. 1; Fig. 3 is a section on line 3—3 of Fig. 1; and Fig. 4 is a section on line 4—4 of Fig. 1.

In the drawings, A. is the axle, having at the outer or free end thereof a screw-threaded section $a$; a cylindrical section $a'$; a squared section $a^2$ and a shoulder $a^3$.

B is the hub, carrying flanges $b$ between which are bolted the spokes $b'$ by means of the bolts $b^2$. Shoulders $b^3$ and $b^4$ are formed within hub B for a purpose hereinafter described.

Mounted on the square portion $a^2$ of the axle A is a sleeve D the outer surface of which forms one element of the raceway for one set of rollers E and which butts up against the shoulder $a^3$. At either end this sleeve is screwthreaded for the reception of rings F F'. Ring F has an annular groove $f$ and ring F' has a groove $f'$ and a ball race $f^2$ for the balls $f^3$. The rollers E are mounted in the raceway formed between sleeve D and the inner surface of the hub and by the curvature of the inner surface of the hub are forced into perfect parallelism with the axis of the axle. As will be seen in the drawings (Fig. 1) the ends of the rollers are diminished in size and each end is provided with a washer $e$, one side of which contacts lightly with the inner circle of the annular groove $f$ or $f'$ in which the washers ride. It will be observed that this contact tends to cause the washers to rotate upon the ends of the rollers as they roll while the car moves, the raceway, with one side of which the washers are in light engagement being longer than that upon the sleeve with which the rollers are in contact and the washer being in addition, smaller than the roller, the result is that, in one revolution of the rollers about the axle, the washers are revolved in the same direction as the rollers but a greater number of times. Upon the inner face of the ring F' is a ball race $f^2$ carrying balls $f^3$ opposed to the shoulder $b^3$ upon the hub. Upon the other end of the axle is sleeve D' which is substantially similar in construction and function to sleeve D. This sleeve carries ring G which is substantially similar in construction and function to the ring F and the sleeve carries also a nut G'. G and G' have annular grooves $g$ $g'$ for the washers $e$ and nut G' has a ball race $g^2$ for balls $g^3$.

The nut G' is a cap nut having at the inner end of its interior a bolt $g^4$ one end of which engages a spring $g^6$ in a recess in the walls of the nut and the other end of which projects outside the nut to serve as an operating finger piece. As will be seen upon reference to the drawing, the portion of the bolt crossing the end of the axle is cut away except a short section $g^5$ at one side. The head of the axle is slotted by two or more slots $a^4$ and in one of these slots the section $g^5$ engages after the nut has been screwed to position to lock the nut in position. In order to screw the nut on or off it is, of course, necessary to press the bolt against the force of the spring $g^6$ to throw the section $g^5$ of the bolt out of engaging position. When the proper adjustment of the nut is attained the bolt is released and the locking section of the bolt engages the first slot opposite to which it comes. A slot $g^7$ in the bolt and a pin $g^8$ in the nut prevents the bolt from being ejected by the spring $g^6$. The hub is closed at its outer end by a locking dust cap H secured upon the end of the hub by a bolt $h$ identical in operation with the bolt $g^4$.

The operation is as follows: The bearing, made up of sleeve D, rings F F', and their related parts being assembled, is slipped to place upon the axle; the wheel is then put in place and the outer bearing made up of the sleeve D' and ring G and nut G' and related parts is then screwed to position. The adjustment for longitudinal movement of the wheel upon the axle is effected by means of the nut G', a quarter turn of which, when the threads on the end of the axle are 16 to the inch for example, will give an inward or outward movement of the nut of one-sixty-fourth of an inch. The two sets of ball bearings coöperate to take end or side thrusts, the amount of play being governed by the adjustment of the ball bearing nut G'. The weight of the car is carried by the rollers E mounted in the rings and these rollers, owing to the function of the oppressed ball bearings receive no endwise stresses. The locking ball bearing nut gives perfect and secure adjustment and organization with perfect ease in assembling and dis-assembling the parts as required, while the entire organization combines simplicity, ease of adjustment and repair, utility and strength in a high degree.

I claim:—

In a roller bearing the combination with an axle of sleeves mounted upon the opposite ends of said axle, a hub surrounding said axle and having a reduced portion to form shoulders at the opposite ends thereof, rings threaded upon said sleeves the opposed faces of said rings having annular grooves formed therein, bearing rollers which lie between the outer periphery of the sleeves and the inner periphery of the hub, washers mounted to travel in said annular grooves, said rollers having their bearings in said washers, and balls mounted in ball races formed in the inner faces of the outer rings and bearing against the shoulders of the hub.

Signed by me at Boston, Massachusetts, this eighth day of January 1908.

HARRY L. HANNAFORD.

Witnesses:
JOSEPH T. BRENNAN,
AGNES A. COLGAN.